United States Patent
Sole Rojals et al.

(10) Patent No.: US 10,284,863 B2
(45) Date of Patent: May 7, 2019

(54) ADAPTIVE CONSTANT-LUMINANCE APPROACH FOR HIGH DYNAMIC RANGE AND WIDE COLOR GAMUT VIDEO CODING

(71) Applicant: QUALCOMM Incorporated, San Diego, CA (US)

(72) Inventors: Joel Sole Rojals, San Diego, CA (US); Sungwon Lee, San Diego, CA (US); Dmytro Rusanovskyy, San Diego, CA (US); Adarsh Krishnan Ramasubramonian, San Diego, CA (US); Done Bugdayci Sansli, Tampere (FI); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 15/175,570

(22) Filed: Jun. 7, 2016

(65) Prior Publication Data
US 2016/0360214 A1    Dec. 8, 2016

Related U.S. Application Data

(60) Provisional application No. 62/172,554, filed on Jun. 8, 2015.

(51) Int. Cl.
H04N 19/187    (2014.01)
H04N 19/64    (2014.01)
(Continued)

(52) U.S. Cl.
CPC ............ *H04N 19/187* (2014.11); *H04N 1/64* (2013.01); *H04N 5/20* (2013.01); *H04N 9/68* (2013.01);
(Continued)

(58) Field of Classification Search
CPC .... H04N 19/187; H04N 19/12; H04N 19/132; H04N 19/136; H04N 19/176;
(Continued)

(56) References Cited

U.S. PATENT DOCUMENTS

| 4,812,903 A | 3/1989 | Wagensonner et al. |
| 5,686,939 A | 11/1997 | Millward et al. |

(Continued)

FOREIGN PATENT DOCUMENTS

| CN | 102761745 A | 10/2012 |
| CN | 103327323 A | 9/2013 |

(Continued)

OTHER PUBLICATIONS

"Parameter values for ultra-high definition television systems for production and international programme exchange," (Recommendation ITU-R BT.2020-1, International Telecommunication Union, Jun. 2014; hereinafter R2020-1).*

(Continued)

*Primary Examiner* — William C Vaughn, Jr.
*Assistant Examiner* — Jae N Noh
(74) *Attorney, Agent, or Firm* — Shumaker & Sieffert, P.A.

(57) ABSTRACT

A device may determine, based on data in a bitstream, a luma sample (Y) of a pixel, a Cb sample of the pixel, and the Cr sample of the pixel. Furthermore, the device may obtain, from the bitstream, a first scaling factor and a second scaling factor. Additionally, the device may determine, based on the first scaling factor, the Cb sample for the pixel, and Y, a converted B sample (B') for the pixel. The device may determine, based on the second scaling factor, the Cr sample for the pixel, and Y, a converted R sample (R') for the pixel. The device may apply an electro-optical transfer function (EOTF) to convert Y', R', and B' to a luminance sample for (Continued)

the pixel, a R sample for the pixel, and a B sample for the pixel, respectively.

28 Claims, 12 Drawing Sheets

(51) Int. Cl.
| | |
|---|---|
| H04N 19/182 | (2014.01) |
| H04N 19/176 | (2014.01) |
| H04N 19/132 | (2014.01) |
| H04N 19/136 | (2014.01) |
| H04N 1/64 | (2006.01) |
| H04N 9/68 | (2006.01) |
| H04N 19/46 | (2014.01) |
| H04N 19/12 | (2014.01) |
| H04N 19/186 | (2014.01) |
| H04N 5/20 | (2006.01) |

(52) U.S. Cl.
CPC ........... *H04N 19/12* (2014.11); *H04N 19/132* (2014.11); *H04N 19/136* (2014.11); *H04N 19/176* (2014.11); *H04N 19/182* (2014.11); *H04N 19/186* (2014.11); *H04N 19/46* (2014.11)

(58) Field of Classification Search
CPC .... H04N 19/182; H04N 19/186; H04N 19/46; H04N 1/64; H04N 5/20; H04N 9/68
USPC ................................................... 375/240.02
See application file for complete search history.

(56) References Cited

U.S. PATENT DOCUMENTS

| | | | |
|---|---|---|---|
| 7,567,722 | B2 | 7/2009 | Liu et al. |
| 7,692,562 | B1 | 4/2010 | Wu et al. |
| 8,498,332 | B2 | 7/2013 | Jiang et al. |
| 8,718,451 | B1 | 5/2014 | Linzer et al. |
| 2016/0005349 | A1* | 1/2016 | Atkins ............... H04N 5/20 345/591 |
| 2016/0205367 | A1* | 7/2016 | Wallace ............ H04N 9/64 348/571 |
| 2016/0227227 | A1* | 8/2016 | Deshpande .......... H04N 19/186 |
| 2016/0316207 | A1* | 10/2016 | Minoo ................. H04N 19/136 |
| 2016/0360213 | A1 | 12/2016 | Lee et al. |
| 2017/0026646 | A1 | 1/2017 | Minoo et al. |

FOREIGN PATENT DOCUMENTS

| | | |
|---|---|---|
| CN | 104519370 A | 4/2015 |
| JP | S62220087 A | 9/1987 |
| WO | WO-2006102571 A1 | 9/2006 |
| WO | 2014130343 A2 | 8/2014 |

OTHER PUBLICATIONS

Chiang, et al.,"Saturation Adjustment Method based on Human Vision with YCbCr Color Model Characteristics and Luminance Changes," Intelligent Signal Processing and Communications Systems (ISPACS), 2012 International Symposium on, IEEE, Nov. 4, 2012, pp. 136-141.
"Digital Cinema System Specification," Digital Cinema Initiatives, LLC, Version 1.2, Mar. 7, 2008, 156 pp.
Lee, et al., "CE2-related: Report of LumaATF with LCS," MPEG Meeting; Oct. 19-23, 2015; Geneva; (Motion Picture Expert Group or IOS/IEC JTC1/SC29/WG11), No. m37245, Oct. 16, 2015, 5 pp.
Luthra, et al., "New Draft CfE for HDR and WCG Video Coding," MPEG Meeting; Feb. 6-20, 2015; Geneva; (Motion Picture Expert Group or IOS/IEC JTC1/SC29/WG11), No. m36131, Feb. 20, 2015, 47 pp.
"D-Cinema Distribution Master—Image Characteristics," SMPTE Standard, SMPTE 428-1-2006, Sep. 29, 2006, 8 pp.
Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.
Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
"CIE 15: technical Report: Colorimetry," 3rd edition, 2004, 82 pp (ISBN 3 901 906 33 9).
"Candidate Test Model for HEVC extension for HDR and WCG video coding," ISO/IEC JTC1/SC29/WG11 MPEG2015/m37xxx; Oct. 2015, Geneva, Switzerland, 10 pp.
Miller, et al., "Perceptual Signal Coding for More Efficient Usage of Bit Codes," The 2012 Annual Technical Conference & Exhibition, Oct. 23-25, 2012, 39 slides.
Miller, "A Perceptual EOTF for Extended Dynamic Range Imagery," Dolby Laboratories, Inc., www.smpte.org, May 6, 2014; 34 slides.
Ford, et al., "Colour Space Coversions," Aug. 11, 1998, 31 pp.

(56) References Cited

OTHER PUBLICATIONS

Kirk, "Standard Colour Spaces," FL-TL-TN-0417-StdColourSpaces, FilmLight, Version 4.0, Nov. 30, 2010, 47 pp.
Wiegand, "Acquisition, Representation, Display, and Perception of Images and Video," Digital Image Communication, accessed on May 27, 2016, 47 slides.
Luthra, "Call for Evidence (CfE) for HDR and WCG Video Coding," ISO/IEC JTC1/SC29/WG11 MPEG2014/N15083, Feb. 2015, 46 pp.
"High Dynamic Range Electro-Optical Transfer Function of Mastering Reference Displays," SMPTE ST 2084:2014; SMPTE Standard, Aug. 16, 2014, 14 pp.
Fjelsted, et al., "Understanding HDR," SpecraCal, Inc., May 2015, 4 pp.
"Parameter values for the HDTV standards for production and international programme exchange," Recommendation ITU-R BT.709-6, International Telecommunication Union, Jun. 2015, 19 pp.
"Parameter values for ultra-high definition television systems for production and international programme exchange," Recommendation ITU-R BT.2020-2, International Telecommunication Union, Oct. 2015, 8 pp.
"High Dynamic Range Electro-Optical Transfer Function of Mastering Reference Displays," SMPTE Standard; SMPTE ST 2084:2014; Aug. 16, 2014; 14 pp.
Wang, et al. "High Efficiency Video Coding (HEVC) Defect Report 3," JCT-VC Meeting: Jan. 9-17, 2014; (Joint Collaborative Team on Video Coding of ISO/IEC JTC1/SC29/WG11 and ITU-T SG.16); No. JCTVC-P1003_v1; Feb. 8, 2014; 313 pp.
Sole, et al., "HDR CE5 test 3: Constant Luminance results," JCT-VC Meeting: Feb. 19-26, 2016; (Joint Collaborative Team on Video Coding of ISO/IEC JTC1/SC29/WG11 and ITU-T SG.16); No. JCTVC-W0099; Feb. 21, 2016; 5 pp.
Wang, et al. "High Efficiency Video Coding (HEVC) Defect Report 3," JCT-VC Meeting: Jan. 9-17, 2014; (Joint Collaborative Team on Video Coding of ISO/IEC JTC1/SC29/WG11 and ITU-T SG.16); No. JCTVC-P1003_v1 relative to O1003v2; Feb. 8, 2014; 313 pp.
Rusanovskyy, et al., "Description of Core Experiment 1 (CE1): Optimization without HEVC specification change," ISO/IEC JTC1/SC29/WG11, N15455, Video Subgroup, Jun. 2015, 4 pp.
"Parameter values for the HDTV standards for production and international programme exchange," Recommendation ITU-R BT.709-5, International Telecommunication Union, Apr. 2002, 32 pp.
International Search Report and Written Opinion from International Application No. PCT/US2016/036479, dated Jul. 27, 2016, 13 pp.
Fogg, et al., "Indication of SMPTE 2084, 2085 and Carriage of 2086 Metadata in HEVC", JCT-VC Meeting; Jan. 9-17, 2014; San Jose; (Joint Collaborative Team on Video Coding of ISO/IEC JTC1/SC29/WG11 and ITU-T SG.16); URL: http:/wftp3.itu.int/av-arch/jctvc-site/, No. JCTVC-P0084-v2, Jan. 14, 2014; XP030115562, 5 pp.
Stessen, et al., "Chromaticity Based Color Signals for Wide Color Gamut and High Dynamic Range", ISO/IEC JTC1/SC29/WG11 Coding of Moving Pictures and Audio, MPEG2014/M35065, Oct. 2014, XP055273234, 18 pp.
Sullivan, et al., "Overview of the High Efficiency Video Coding (HEVC) Standard", IEEE Transactions on Circuits and Systems for Video Technology, Sep. 28, 2012, XP55045358, ISSN: 1051-8215, DOI:10.1109/TCSVT.2012.2221191, 19 pp.
Working Party 6C: "Revision 1 to Document 6/18-E—Draft New Recommendation ITU-R BT [Image-UHDTV]: Parameter Values for UHDTV Systems for Production and International Programme Exchange", Document 6C/TEMP/26—Radio Communication Study Groups, ITU, May 2, 2012, XP030053584, 6 pp.
International Preliminary Report on Patentability—PCT/US2016/036479, The International Bureau of WIPO—Geneva, Switzerland, Dec. 21, 2017, 9 pgs.

* cited by examiner

ADAPTIVE CONSTANT-LUMINANCE APPROACH FOR HIGH DYNAMIC RANGE AND WIDE COLOR GAMUT VIDEO CODING

This application claims the benefit of U.S. Provisional Patent Application 62/172,554, filed Jun. 8, 2015, the entire content of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to coding of video signals with High Dynamic Range (HDR) and Wide Color Gamut (WCG) representations. For example, particular techniques for signaling and operations are applied to video data in certain color spaces to enable more efficient compression of HDR and WCG video data. Particular techniques of this disclosure may improve the compression efficiency of hybrid based video coding systems utilized for coding HDR and WCG video data.

In one example, this disclosure describes a method of encoding video data, the method comprising: determining, based on a R sample of a pixel of the video data, a G sample of the pixel, and a linear light B sample of the pixel, a luminance sample (Y) for the pixel, wherein the R sample, the G sample, the B sample, and the luminance sample are in linear light; applying an optical-electro transfer function (OETF) to convert Y, the R sample, and the B sample to a converted luma sample (Y'), a converted R sample (R'), and a converted B sample (B'); determining, based on a first scaling factor, B', and Y', a Cb sample for the pixel; determining, based on a second scaling factor, R', and Y', a Cr sample for the pixel; encoding a block of video data comprising Y', the Cb sample, and the Cr sample; and signaling, in a bitstream comprising a coded representation of the video data, the first scaling factor and the second scaling factor.

In another example, this disclosure describes a method of decoding video data, the method comprising: determining, based on data in a bitstream comprising an encoded representation of the video data, a luma sample of a pixel Y', a Cb sample of the pixel, and a Cr sample of the pixel; obtaining, from the bitstream, a first scaling factor and a second scaling factor; determining, based on the first scaling factor, the Cb sample for the pixel, and Y', a converted B sample (B') for the pixel; determining, based on the second scaling factor, the Cr sample for the pixel, and Y', a converted R sample (R') for the pixel; and applying an electro-optical transfer function (EOTF) to convert Y', R', and B' to a luminance sample (Y) for the pixel, a R sample for the pixel, and a B sample for the pixel, respectively, wherein the R sample, the G sample, and the luminance sample are in linear light.

In another example, this disclosure describes an apparatus for encoding video data, the apparatus comprising: a storage medium configured to store the video data; and one or more processors configured to: determine, based on a R sample of a pixel of the video data, a G sample of the pixel, and a B sample of the pixel, a luminance sample (Y) for the pixel, wherein the R sample, the G sample, the B sample, and the luminance sample are in linear light; apply an optical-electro transfer function (OETF) to convert the luminance sample, the R sample, and the B sample to a luma sample (Y'), a converted R sample (R'), and a converted B sample (B'); determine, based on a first scaling factor, B', and Y', a Cb sample for the pixel; determine, based on a second scaling factor, R', and Y', a Cr sample for the pixel; encode a block of video data comprising Y', the Cb sample, and the Cr sample; and signal, in a bitstream comprising a coded representation of the video data, the first scaling factor and the second scaling factor.

In another example, this disclosure describes an apparatus for decoding video data, the apparatus comprising: a storage medium configured to store the video data; and one or more processors configured to: determine, based on data in a bitstream comprising an encoded representation of the video data, a luma sample (Y') of a pixel, a Cb sample of the pixel, and a Cr sample of the pixel; obtain, from the bitstream, a first scaling factor and a second scaling factor; determine, based on the first scaling factor, the Cb sample for the pixel, and Y', a converted B sample (B') for the pixel; determine, based on the second scaling factor, the Cr sample for the pixel, and Y', a converted R sample (R') for the pixel; and apply an electro-optical transfer function (EOTF) to convert Y', R', and B' to a luminance sample (Y) for the pixel, a R sample for the pixel, and a B sample for the pixel, respectively, wherein the R sample, the G sample, and the luminance sample are in linear light.

The details of one or more examples of the disclosure are set forth in the accompanying drawings and the description below. Other features, objects, and advantages will be apparent from the description, drawings, and claims.

DETAILED DESCRIPTION

This disclosure is related to coding of video signals with High Dynamic Range (HDR) and Wide Color Gamut (WCG) representations. More specifically, the techniques of this disclosure include signaling and operations applied to video data in certain color spaces to enable more efficient compression of HDR and WCG video data. The proposed techniques may improve compression efficiency of hybrid based video coding systems (e.g., HEVC-based video coders) used for coding HDR and WCG video data.

For instance, constant luminance (CL) is a form of color transform that transforms color data from a RGB color space data to a Y'CbCr color space. However, existing forms of CL may not be fully suited for HDR and WCG video. As described below, techniques of this disclosure may address this issue. For instance, a source device and a destination device may apply scaling factors during the application of a CL transform. These scaling factors may be adapted based on particular dynamic ranges, color gamuts, and/or other factors. Advantageously, in some examples, in contrast to existing systems, different scaling factors may be used without changing hardware and/or software for implementing the CL transform.

Figure 1:
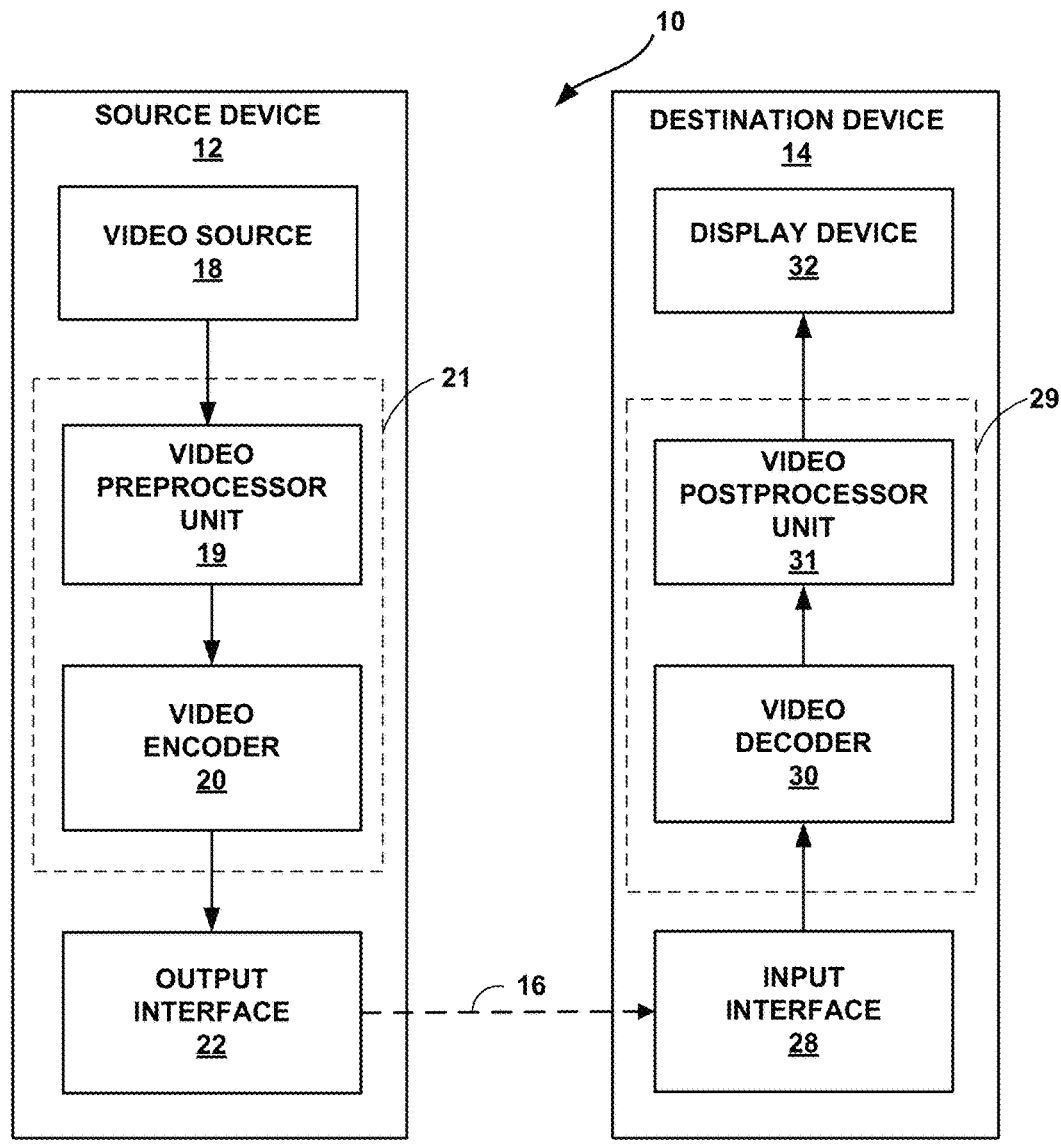
FIG. 1 is a block diagram illustrating an example video encoding and decoding system configured to implement techniques of the disclosure.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

In the example of FIG. 1, source device 12 includes video source 18, video encoding unit 21, which includes video preprocessor unit 19 and video encoder 20, and output interface 22. Destination device 14 includes input interface 28, video decoding unit 29, which includes video decoder 30 and video postprocessor unit 31, and display device 32. In accordance with some example of this disclosure, video preprocessor unit 19 and video postprocessor unit 31 may be configured to perform all or parts of particular techniques described in this disclosure. For example, video preprocessor unit 19 and video postprocessor unit 31 may include a static transfer function unit configured to apply a static transfer function, but with pre- and post-processing units that can adapt signal characteristics.

In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." For ease of description, the disclosure is described with respect to video preprocessor unit 19 and video postprocessor unit 31 performing the example techniques described in this disclosure in respective ones of source device 12 and destination device 14. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. Source device 12 may comprise one or more data storage media configured to store the video data. As mentioned above, however, the techniques described in this disclosure may be applicable to video coding in general, and may be applied to wireless and/or wired applications. In each case, the captured, pre-captured, or computer-generated video may be encoded by video encoding unit 21. The encoded video information may then be output by output interface 22 onto a computer-readable medium 16.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20 of video encoding unit 21, which is also used by video decoder 30 of video decoding unit 29, that includes syntax elements that describe characteristics and/or processing of blocks and other coded units, e.g., groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

As illustrated, video preprocessor unit 19 receives the video data from video source 18. Video preprocessor unit 19 may be configured to process the video data to convert the video data into a form that is suitable for encoding with video encoder 20. For example, video preprocessor unit 19 may perform dynamic range compacting (e.g., using a non-linear transfer function), color conversion to a more compact or robust color space, and/or floating-to-integer representation conversion. Video encoder 20 may perform video encoding on the video data outputted by video preprocessor unit 19. Video decoder 30 may perform the inverse of video encoder 20 to decode video data, and video postprocessor unit 31 may perform the inverse of the operations performed by video preprocessor unit 19 to convert the video data into a form suitable for display. For instance, video postprocessor unit 31 may perform integer-to-floating conversion, color conversion from the compact or robust color space, and/or inverse of the dynamic range compacting to generate video data suitable for display.

Video encoding unit 21 and video decoding unit 29 each may be implemented as any of a variety of suitable processing circuitry, including fixed function processing circuitry and/or programmable processing circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoding unit 21 and video decoding unit 29 may be included in one or more encoders or decoders, either of which may be integrated as part of a combined encoder/decoder (CODEC) in a respective device.

Although video preprocessor unit 19 and video encoder 20 are illustrated as being separate units within video encoding unit 21 and video postprocessor unit 31 and video decoder 30 are illustrated as being separate units within video decoding unit 29, the techniques described in this disclosure are not so limited. Video preprocessor unit 19 and video encoder 20 may be formed as a common device (e.g., integrated circuit or housed within the same chip). Similarly, video postprocessor unit 31 and video decoder 30 may be formed as a common device (e.g., integrated circuit or housed within the same chip).

In some examples, video encoder 20 and video decoder 30 may operate according to the High Efficiency Video Coding (HEVC) standard developed by the Joint Collaboration Team on Video Coding (JCT-VC) of ITU-T Video Coding Experts Group (VCEG) and ISO/IEC Motion Picture Experts Group (MPEG). A draft of the HEVC standard, referred to as the "HEVC draft specification" is described in Bross et al., "High Efficiency Video Coding (HEVC) Defect Report 3," Joint Collaborative Team on Video Coding (JCT-VC) of ITU-T SG16 WP3 and ISO/IEC JTC1/SC29/WG11, 16$^{th}$ Meeting, San Jose, US, January 2014, document no. JCTVC-P1003_v1. The HEVC draft specification is available from http://phenix.it-sudparis.eu/jct/doc_end_user/documents/16_San %20Jose/wg11/JCTVC-P1003-v1.zip.

Furthermore, there are ongoing efforts to produce a scalable video coding extension for HEVC. The scalable video coding extension of HEVC may be referred to as SHEVC or SHVC. Additionally, a Joint Collaboration Team on 3D Video Coding (JCT-3C) of VCEG and MPEG is developing a 3DV standard based on HEVC. Part of the standardization efforts for the 3DV standard based on HEVC includes the standardization of a multi-view video codec based on HEVC (i.e., MV-HEVC).

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive blocks (e.g., luma, Cb, and Cr predictive blocks) for prediction blocks (e.g., luma, Cb, and Cr prediction blocks) of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture that includes the PU.

After video encoder 20 generates predictive blocks (e.g., luma, Cb, and Cr predictive blocks) for one or more PUs of a CU, video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the residual blocks (e.g., the luma, Cb, and Cr residual blocks) of a CU into one or more transform blocks (e.g., luma, Cb, and Cr transform blocks). A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a transform block of a TU to generate a coefficient block for the TU. For instance, video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. Thus, the bitstream comprises an encoded representation of video data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Next generation video applications are anticipated to operate with video data representing captured scenery with HDR and WCG. Parameters of the utilized dynamic range and color gamut are two independent attributes of video content, and their specification for purposes of digital television and multimedia services are defined by several international standards. For example, Recommendation ITU-R BT. 709-5, "Parameter values for the HDTV standards for production and international programme exchange" (2002) (hereinafter, "ITU-R BT. Rec. 709") defines parameters for HDTV (high definition television), such as Standard Dynamic Range (SDR) and standard color gamut, and ITU-R Rec. 2020 specifies UHDTV (ultra-high definition television) parameters such as HDR and WCG. There are also other standards developing organization (SDOs) documents that specify dynamic range and color gamut attributes in other systems, e.g., P3 color gamut is defined in SMPTE-231-2 (Society of Motion Picture and Television Engineers) and some parameters of HDR are defined in SMPTE ST 2084. A brief description of dynamic range and color gamut for video data is provided below.

Figure 2:
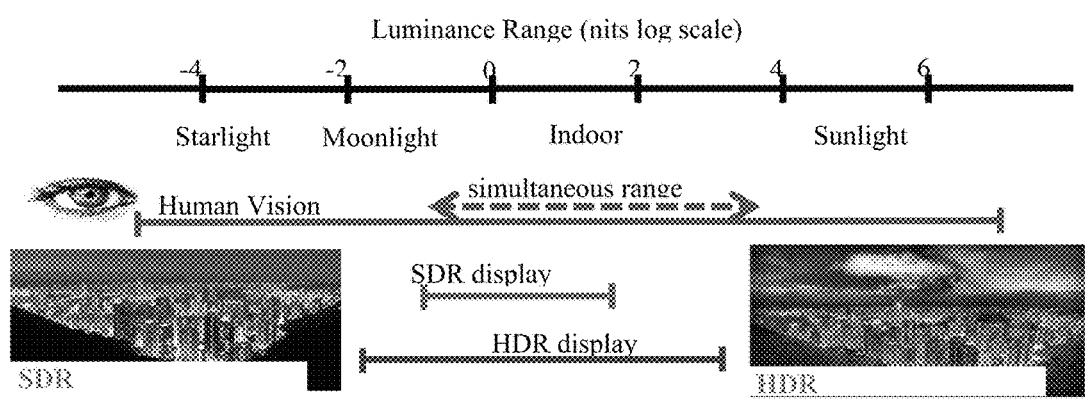
FIG. 2 is a conceptual drawing illustrating the concepts of high dynamic range data.

Dynamic range is typically defined as the ratio between the minimum and maximum brightness of the video signal. Dynamic range may also be measured in terms of 'f-stop,' where one f-stop corresponds to a doubling of the signal dynamic range. In s definition, the HDR content is such content that features brightness variation with more than 16 f-stops. In some terms, levels between 10 and 16 f-stops are considered as intermediate dynamic range, but it is considered HDR in other definitions. At the same time, the human visual system (HVS) is capable of perceiving much larger dynamic range. However, the HVS includes an adaptation mechanism to narrow a so-called simultaneous range. Visualization of dynamic range provided by SDR of HDTV, expected HDR of UHDTV and HVS dynamic range is shown in FIG. 2.

Current video application and services are regulated by ITU-R BT.709 and provide SDR, typically supporting a range of brightness (or luminance) of around 0.1 to 100 candelas (cd) per m2 (often referred to as "nits"), leading to less than 10 f-stops. The next generation video services are expected to provide dynamic ranges of up-to 16 f-stops, and although detailed specifications are currently under development, some initial parameters have been specified in SMPTE ST 2084 and ITU-R BT.2020.

Figure 3:
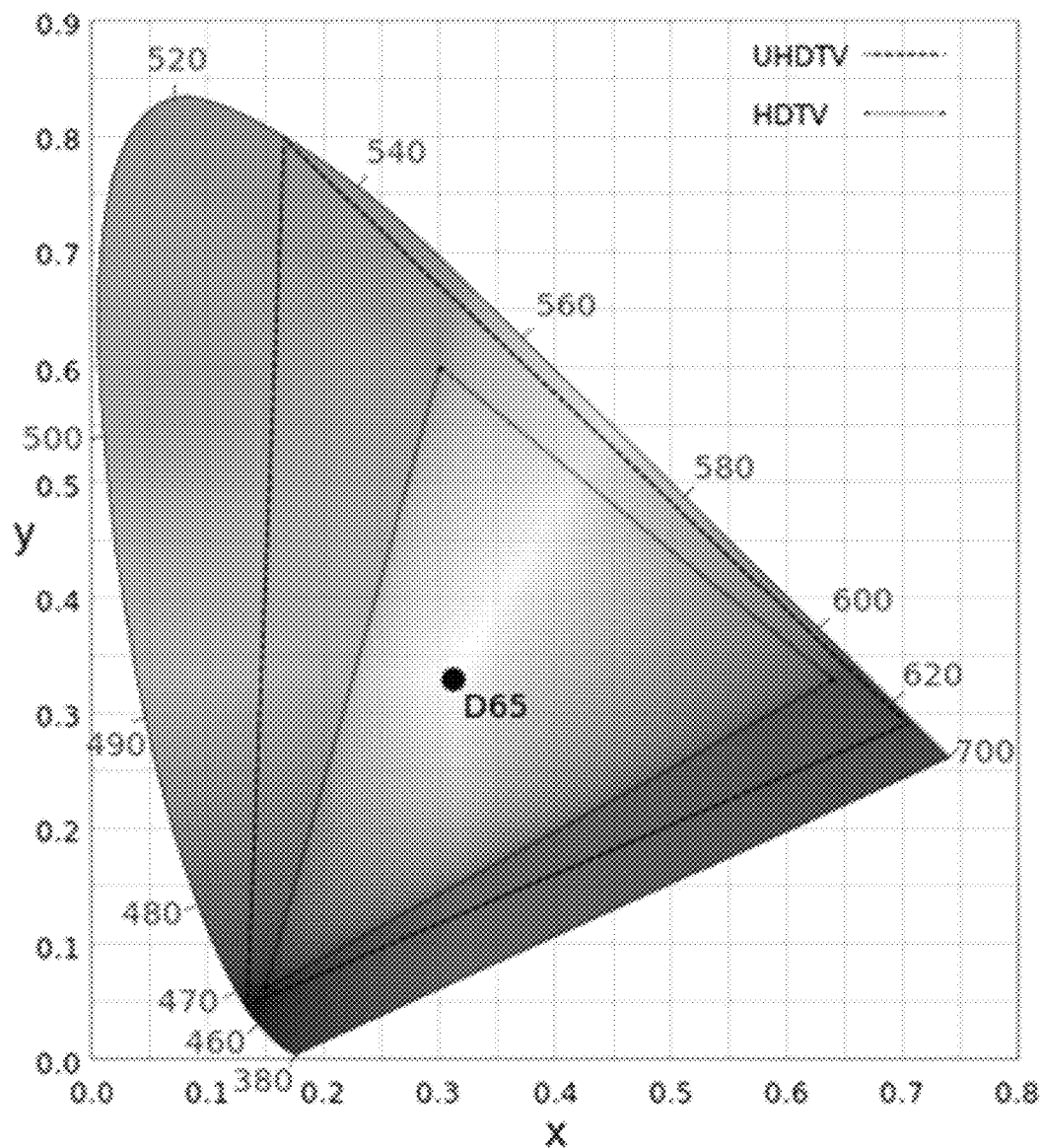
FIG. 3 is a conceptual diagram illustrating example color gamuts.

Another aspect for a more realistic video experience besides HDR is the color dimension, which is conventionally defined by the color gamut. FIG. 3 is a conceptual diagram showing an SDR color gamut (triangle based on the ITU-R BT.709 color red, green and blue color primaries), and the wider color gamut for UHDTV (triangle based on the ITU-R BT.2020 color red, green and blue color primaries). FIG. 3 also depicts the so-called spectrum locus (delimited by the tongue-shaped area), representing limits of the natural colors. As illustrated by FIG. 3, moving from ITU-R BT.709 to ITU-R BT.2020 color primaries aims to provide UHDTV services with about 70% more colors. D65 specifies the white color for given specifications.

A few examples of color gamut specifications are shown in Table 1, below.

TABLE 1

Color gamut parameters
RGB color space parameters

| | Color space | | | | | | | |
|---|---|---|---|---|---|---|---|---|
| | White point | | Primary colors | | | | | |
| | $xx_W$ | $yy_W$ | $xx_R$ | $yy_R$ | $xx_G$ | $yy_G$ | $xx_B$ | $yy_B$ |
| DCI-P3 | 0.314 | 0.351 | 0.680 | 0.320 | 0.265 | 0.690 | 0.150 | 0.060 |
| ITU-R BT.709 | 0.3127 | 0.3290 | 0.64 | 0.33 | 0.30 | 0.60 | 0.15 | 0.06 |
| ITU-R BT.2020 | 0.3127 | 0.3290 | 0.708 | 0.292 | 0.170 | 0.797 | 0.131 | 0.046 |

HDR/WCG is typically acquired and stored at a very high precision per component (even floating point), with the 4:4:4 chroma format and a very wide color space (e.g., XYZ). CIE 1931 is an example of the XYZ color space. This representation targets high precision and is (almost) mathematically lossless. However, this format feature may include a lot of redundancies and is not optimal for compression purposes. A lower precision format with HVS-based assumption is typically utilized for state-of-the-art video applications.

Figure 4:
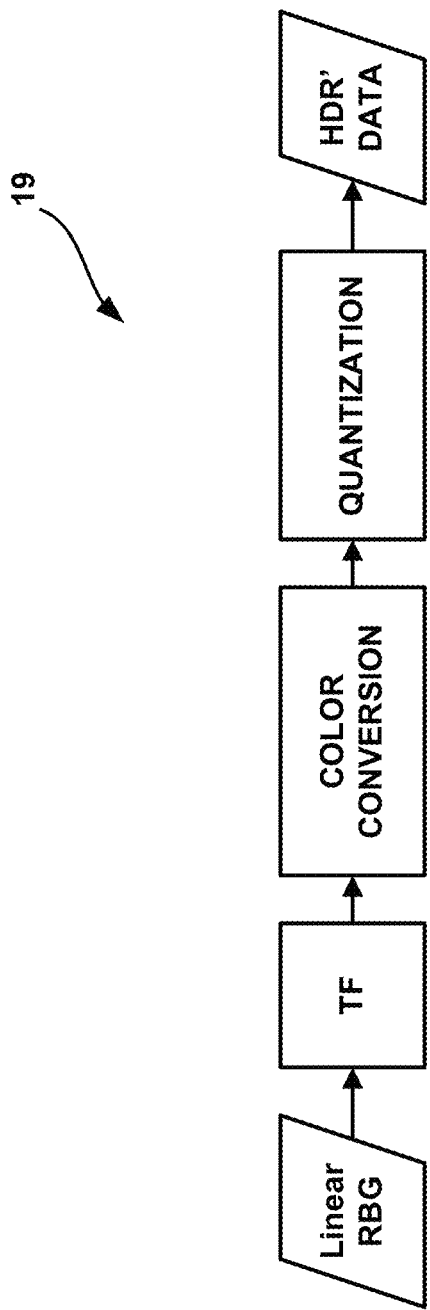
FIG. 4 is a flow diagram illustrating an example High Dynamic Range (HDR)/Wide Color Gamut (WCG) representation conversion.

Typical video data format conversion for purposes of compression consists of 3 major elements, as shown in the example of FIG. 4. The techniques of FIG. 4 may be performed by video preprocessor unit 19 of source device 12. Linear RGB data is compacted using a non-linear transfer function (TF) for dynamic range compacting. The compacted data is then run through a color conversion process into a more compact or robust color space. Data is then quantized using a floating-to-integer representation conversion (Quantization) to produce the HDR' data.

Figure 5:
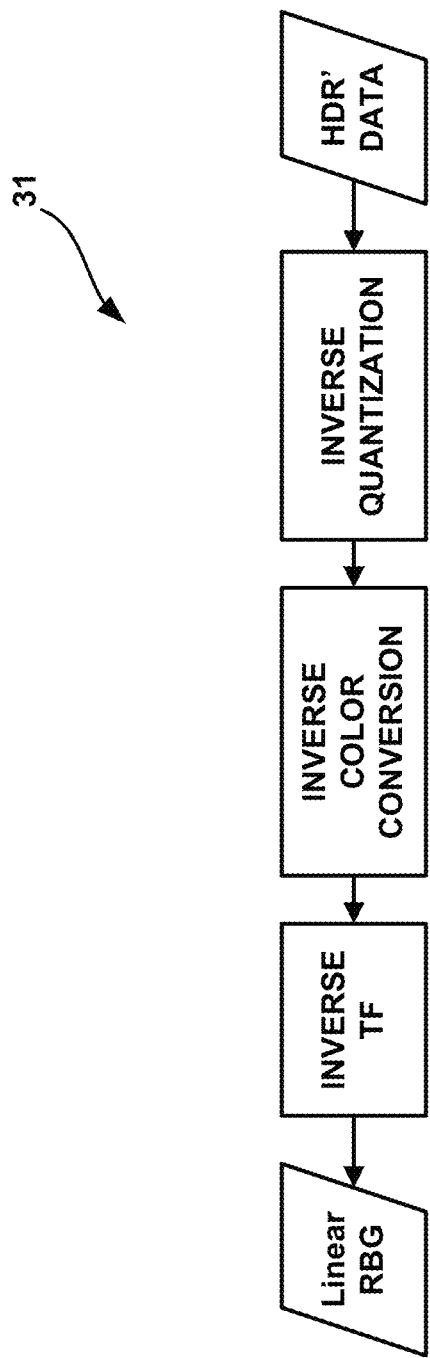
FIG. 5 is a flow diagram showing an example HDR/WCG inverse conversion.

An example inverse conversion at the decoder side is depicted in FIG. 5. Video postprocessor unit 31 of destination device 14 may perform the techniques of FIG. 5. The high dynamic range of input RGB data in linear and floating point representation is compacted with the utilized non-linear transfer function (TF), e.g., PQ TF as defined in SMPTE ST 2084, following which it is converted to a target color space more suitable for compression, e.g. Y'CbCr, and then quantized to achieve integer representation. The order of these elements is given as an example, and may vary in real-world applications, e.g., color conversion may precede the TF module, as well as additional processing, e.g., spatial subsampling may be applied to color components. These three components are described in more detail below.

Figure 6:
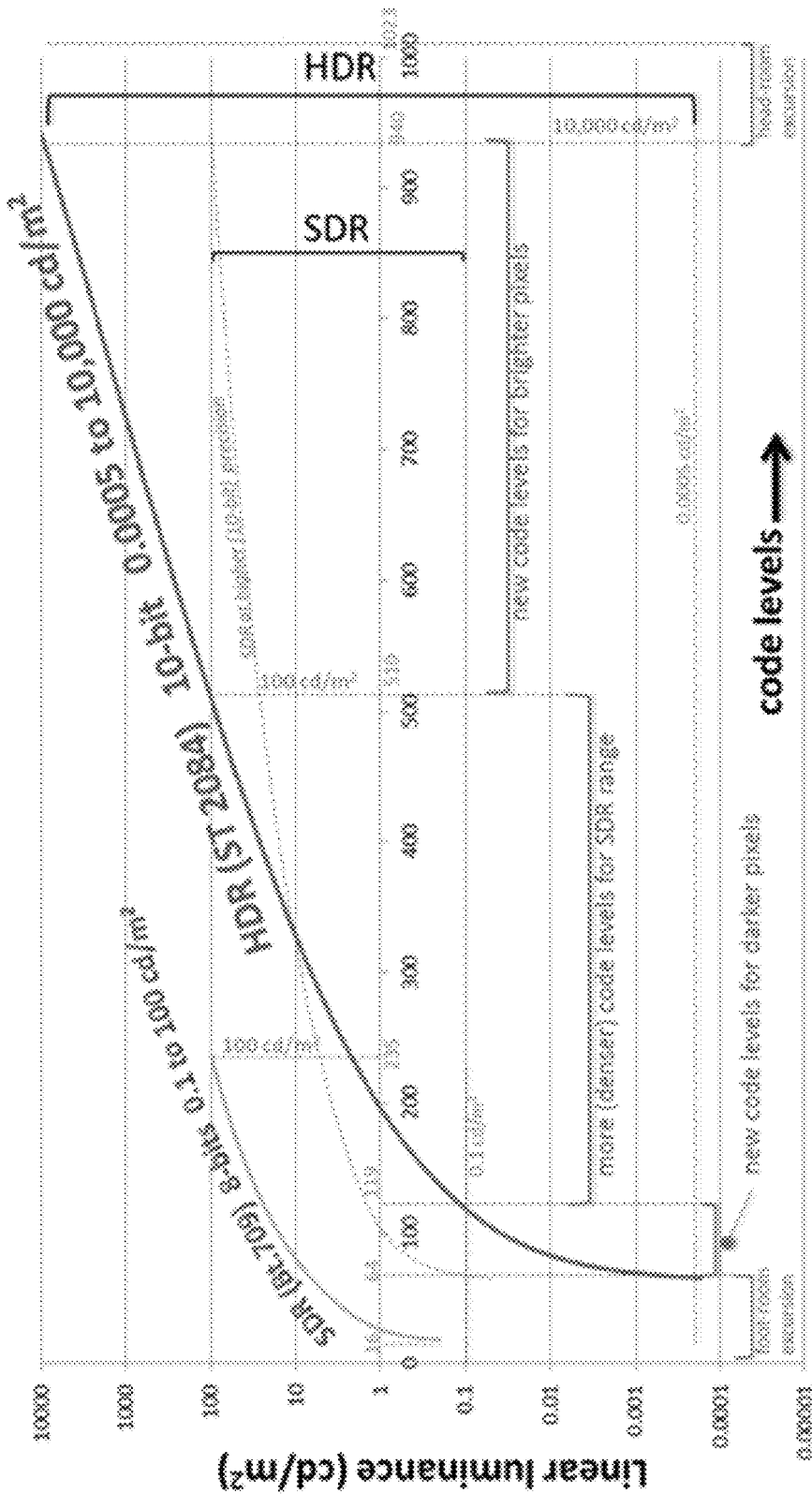
FIG. 6 is conceptual diagram illustrating example transfer functions.

A TF is applied to the data to compact the data's dynamic range and make it possible to represent the data with limited number of bits. This function is typically a one-dimensional (1D) non-linear function either reflecting an inverse of electro-optical transfer function (EOTF) of the end-user display as specified for SDR in ITU-R BT. 709 or approximating the HVS perception to brightness changes as for PQ TF specified in SMPTE ST 2084 for HDR. The inverse process of the OETF is the EOTF (electro-optical transfer function), which maps the code levels back to luminance. FIG. 6 shows several examples of TFs. These mappings may also be applied to each R, G and B component separately, which converts them to R', G', and B', respectively.

RGB data is typically used as input, since RGB data is often produced by image capturing sensors. However, this color space has high redundancy among its components and is not optimal for compact representation. To achieve a more compact and more robust representation, RGB components are typically converted to a more uncorrelated color space (i.e., a color transform is performed) more suitable for compression, e.g., Y'CbCr. This color space separates the brightness in the form of luminance and color information in different un-correlated components.

For modern video coding systems, a typically used color space is Y'CbCr, as specified in ITU-R BT.709 or ITU-R BT.709 (Recommendation ITU-R BT. 709-5, "Parameter values for the HDTV standards for production and international programme exchange" (2002), hereinafter, "Recommendation ITU-R BT. 709-5"). The Y'CbCr color space in BT.709 standard specifies the following conversion process from R'G'B' to Y'CbCr (non-constant luminance representation):

$$a. \ Y' = 0.2126*R' + 0.7152*G' + 0.0722*B' \qquad (3)$$

$$b. \ Cb = \frac{B' - Y'}{1.8556}$$

$$c. \ Cr = \frac{R' - Y'}{1.5748}$$

The above can also be implemented using the following approximate conversion that avoids the division for the Cb and Cr components:

$$d. \ Y'=0.212600*R'+0.715200*G'+0.072200*B'$$

$$e. \ Cb=-0.114572*R'-0.385428*G'+0.500000*B'$$

$$f. \ Cr=0.500000*R'-0.454153*G'-0.045847*B' \qquad (4)$$

Figure 7:
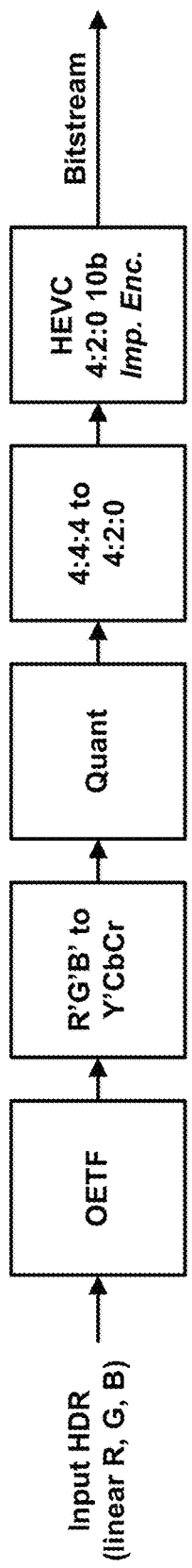
FIG. 7 is a block diagram illustrating an example for non-constant luminance.

The ITU-R BT.2020 standard specifies two different conversion processes from RGB to Y'CbCr: Constant-luminance (CL) and Non-constant luminance (NCL), Recommendation ITU-R BT. 2020, "Parameter values for ultra-high definition television systems for production and international programme exchange" (2012). The RGB data may be in linear light and Y'CbCr data is non-linear. FIG. 7 is a block diagram illustrating an example for non-constant luminance. Particularly, FIG. 7 shows an example of an NCL approach. The NCL approach of FIG. 7 applies the conversion from R'G'B' to Y'CbCr after OETF. The conversion is done as below.

$$a. \ Y' = 0.2627*R' + 0.6780*G' + 0.0593*B' \qquad (5)$$

$$b. \ Cb = \frac{B' - Y'}{1.8814}$$

$$c. \ Cr = \frac{R' - Y'}{1.4746}$$

Figure 8:
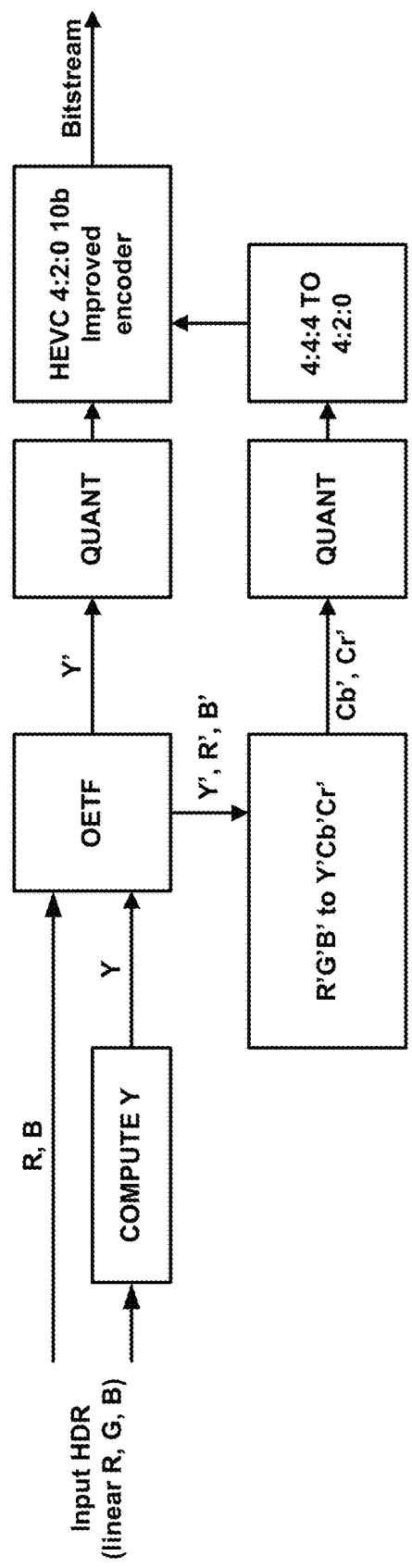
FIG. 8 is a block diagram illustrating an example for constant luminance.

On the other hand, the CL approach generates Y'CbCr as illustrated in FIG. 8. FIG. 8 is a block diagram illustrating an example for constant luminance. To generate Y', luminance, Y, is first computed from R, G, and B in linear light, then Y' is obtained by applying OETF to Y. Two chroma components, Cb and Cr, are computed using Y', R', and B', where R' and B' are obtained by applying OETF to R and B. The details are described in the following equation.

a. $Y' = TF(0.2627*R + 0.6780*G + 0.0593*B)$ (6)

b. $Cb' = \begin{cases} \frac{B'-Y'}{1.9404}, & -0.9702 \leq B'-Y' < 0 \\ \frac{B'-Y'}{1.5816}, & 0 < B'-Y' \leq 0.7908 \end{cases}$ c. $Cr' = \begin{cases} \frac{R'-Y'}{1.7184}, & -0.8592 \leq R'-Y' < 0 \\ \frac{R'-Y'}{0.9936}, & 0 < R'-Y' \leq 0.4968 \end{cases}$ Equations (5) and (6) are based on BT. 2020 color primaries and OETF specified in ITU-R BT.2020. Thus, if different OETF and/or color primaries are utilized, the denominators in those formulas should be derived for the corresponding OETF and/or color primaries. Additionally, both color spaces remain normalized; therefore, for the input values normalized in the range 0 . . . 1, the resulting values may be mapped to the range 0 . . . 1. Generally, color transforms implemented with floating point accuracy provide perfect reconstruction. Thus, this process is lossless.

Quantization/Fix point conversion: Following the color transform, input data in a target color space still represented at high bit-depth (e.g., floating point accuracy) is converted to a target bit-depth. Certain studies show that 10-12 bits accuracy in combination with the PQ TF is sufficient to provide HDR data of 16 f-stops with distortion below the Just-Noticeable Difference. Data represented with 10-bit accuracy can be further coded with most of the state-of-the-art video coding solutions. This quantization is an element of lossy coding and is a source of inaccuracy introduced to converted data.

Constant Luminance (CL) has been known to reduce the crosstalk of the luminance and chrominance information, thus generally performing better than NCL in terms of details of the compressed video. However, the formula for CL is not fully optimized to new types of contents such as HDR/WCG video. Additionally, the traditional CL lacks the flexibility that takes into consideration the spatio-temporal dynamics of HDR/WCG video.

This disclosure describes techniques of Adaptive Constant-Luminance (ACL) that provides more flexibility in a CL framework. By introducing four ACL parameters (two for each of chroma components Cb and Cr), the coding efficiency can increase due to providing higher accuracy representation. Additionally, the proposed approach can be easily combined with any other techniques applied to TF, chrominance information, or quantization. Lastly, the complexity increase of ACL may be negligible. In some examples, techniques of this disclosure may be performed by video preprocessor unit 19 and/or video postprocessor unit 31.

For a given OETF and color primaries, ACL is formulated by introducing four scaling factors, $s_i$, for Cb and Cr computation as below. In this disclosure, the four scaling factors may be referred to as the "ACL parameters." A clipping or other dynamic range adjustment technique can be used to prevent Cb and Cr from exceeding the range of [−0.5, 0.5].

$Y' = TF(0.2627*R + 0.6780*G + 0.0593*B)$ (7)

-continued $Cb' = \begin{cases} s_1 \frac{B'-Y'}{Nb}, & -\frac{Nb}{2} \leq B'-Y' < 0 \\ s_2 \frac{B'-Y'}{Pb}, & 0 < B'-Y' \leq \frac{Pb}{2} \end{cases}$ $Cr' = \begin{cases} s_3 \frac{R'-Y'}{Nr}, & -\frac{Nr}{2} \leq R'-Y' < 0 \\ s_4 \frac{R'-Y'}{Pr}, & 0 < R'-Y' \leq \frac{Pr}{2} \end{cases}$ where signal components R, G, and B are in linear light and TF(•) is the given OETF. The signal components R', G', and B' are the output of TF(•) for each corresponding component, i.e., R'=TF(R), G'=TF(G), and B'=TF(B). The four denominators in equations (7), Nb, Pb, Nr, and Pr, are derived as follows.

For given color primaries such that $Y=C_R*R+C_G*G+C_B*B$, where $C_R$, $C_b$ and $C_g$ are parameters of the color transform:

$Nb = 2*TF(1-C_B)$ $Pb = 2*(TF(C_B))$ $Nr = 2*TF(1-C_R)$ $Pr = 2*(1-TF(C_R))$ (8)

For instance, in equations (6) and (7) above, $C_R$ is equal to 0.2627, $C_G$ is equal to 0.6780, and $C_B$ is equal to 0.0593. In this disclosure, the term "color primaries" or "color containers" refers to a set of colors (such as R, G, B) which in (linear) combinations generate a range of colors. For example, BT.2020 defines specific Red, Green and Blue which, by linear combination (with weights from 0 to 1), generate the entire BT.2020 color space (the large triangle in FIG. 3)

Thus, video preprocessor unit 19 may apply an OETF (i.e., TF(•)) to convert the luminance sample (Y), the R sample (R), and the B sample (B) to a luma sample (Y'), a converted R sample (R'), and a converted B sample (B'), respectively. Furthermore, using equation (7) above, video preprocessor unit 19 may determine, based on a first scaling factor ($s_1$ or $s_2$), B', and Y', a Cb sample (Cb') for the pixel. Additionally, using equation (7) above, video preprocessor unit 19 may determine, based on a second scaling factor ($s_3$ or $s_4$), R', and Y', a Cr sample (Cr') for the pixel. It is noted that in some terminology schemes, the terms "luma" and "luminance" are interchangeable; thus, the luminance sample (Y) may be referred to as a luma sample, even though Y is in linear light, and the luma sample (Y') may be referred to as a converted luma sample.

In equation (7), the value of the first scaling factor ($s_1$ or $s_2$) is dependent on whether the difference between B' and Y' (B'−Y') is in a first range $\left(-\frac{Nb}{2} \leq B'-Y' < 0\right)$ or a second, non-overlapping range $\left(0 < B'-Y' \leq \frac{Pb}{2}\right)$ (i.e., a second range not overlapping the first range). The value of the second scaling factor ($s_3$ or $s_4$) is dependent on whether the difference between R' and Y' (R'−Y') is in a third range $$\left(-\frac{Nr}{2} \le R' - Y' < 0\right)$$

or a fourth, non-overlapping range $$\left(0 < R' - Y' \le \frac{Pr}{2}\right)$$

(i.e., a fourth range not overlapping the third range). Note that the values of (Nb, Pb, Nr, Pr) depends on OETF (i.e., TF(•)) used as in (8).

In various examples, video preprocessor unit 19 and/or video postprocessor unit 31 may derive the ACL parameter (i.e., the scaling factors) in different ways. For instance, in one example, the ACL parameters are derived satisfying both $s_1/Nb=s_2/Pb=K_1$ and $s_3/Nr=s_4/Pr=K_2$ (where $K_1$ and $K_2$ are any floating numbers) to minimize the complexity. Thus, in this example, $s_1$ and $s_2$ may be derived such that $s_1/Nb$ and $s_2/Pb$ are equal to one another. Moreover, in this example, $s_3$ and $s_4$ may be derived such that $s_3/Nr$ and $s_4/Pr$ are equal to one another. In another example, ACL parameters are derived without such restrictions. In some examples, the set of ACL parameters is constant for all the pictures of input HDR video and for all types of color primary and all types of TF.

In some examples, the ACL parameters adaptively change (e.g., be determined, applied, and signaled) with respect to the characteristics of the input HDR video, color primaries, and TF. For instance, video preprocessor unit 19 and/or video postprocessor unit 31 may adaptively determine $s_1$, $s_2$, $s_3$, and $s_4$ based on at least one of: one or more characteristics of an input signal of the video data, color primaries, or the OETF. For instance, in one example, video preprocessor unit 19 and video postprocessor unit 31 may use different ACL parameters depending on the OETF used. In some examples, video preprocessor unit 19 and video postprocessor unit 31 may use different ACL parameters depending on the color primaries used. In some examples, a container for input HDR video data may be for a first color space (e.g., BT.2020), but the actual input HDR video data has a second, different color space (e.g., BT.709). Accordingly, in this example, video preprocessor unit 19 and video postprocessor unit 31 may use ACL parameters for the second color space instead of the first color space. An example of using second color space in this manner is described elsewhere in this disclosure.

In some examples, the signal resulting from ACL undergoes a check to determine that the signal is realistic or undergoes clipping to prevent the signal from exceeding the specified signal range. For example, video preprocessor unit 19 may check that Cb' and Cr' are in the range [−0.5, 0.5] and, if not, clip Cb' or Cr' to this range.

In some examples, the ACL parameters are derived at the encoder and decoder sides through a specified process from an input signal or from other available parameters associated with input signal and processing flow. For example, an OETF for input HDR video may adaptively vary for different pictures and an encoder may signal the parameters of the OETF to a decoder. For instance, suppose that a default OETF is $TF_0(•)$, e.g., PQ TF as defined in SMPTE ST 2084, and the OETF for certain pictures is $TF_1(•)$. Given $TF_0(•)$ and $TF_1(•)$, the encoder and the decoder can derive the ACL parameters for the pictures, e.g., $s_1=TF_0(1-C_B)/TF_1(1-C_B)$ and $s_2=(1-TF_0(C_B))/(1-TF_1(C_B))$, similarly for $s_3$ and $s_4$.

In some examples, the ACL parameters are estimated at the encoder side and signaled to the decoder through a bitstream (metadata, SEI message, VUI, etc.). For instance, source device 12 may signal the ACL parameters in the bitstream. A decoder (e.g., destination device 14) receives the ACL parameters from the bitstream. Thus, in accordance with such an example, video preprocessor unit 19 of video encoding unit 21 may determine, based on an R sample of a pixel of the video data, a G sample of the pixel, and a B sample of the pixel, a luminance sample (Y) for the pixel. Additionally, video preprocessor unit 19 may apply an OETF to convert Y, the R sample, and the B sample to a luma sample (Y'), a converted R sample (R'), and a converted B sample (B'), respectively.

For instance, video preprocessor unit 19 may apply any of the OETFs described in this disclosure. In this example, video preprocessor unit 19 may determine, based on a first scaling factor (e.g., $s_1$ or $s_2$), B', and Y', a Cb sample for the pixel. Video preprocessor unit 19 may determine, based on a second scaling factor (e.g., $s_3$ or $s_4$), R', and Y', a Cr sample for the pixel. Video preprocessor unit 19 may use equation (7) to determine the Cb sample and the Cr sample. In some examples, video preprocessor unit 19 adaptively determines the first scaling factor and the second scaling factor, as described elsewhere in this disclosure.

Furthermore, video encoder 20 of video encoding unit 21 may encode a block of video data comprising Y', the Cb sample, and the Cr sample. For instance, video encoder 20 may use HEVC or another video compression technique to encode the block of video data. Video encoding unit 21 may signal, in a bitstream comprising a coded representation of the video data, the first scaling factor and the second scaling factor. For instance, video encoding unit 21 may signal, in the bitstream, syntax elements specifying the first scaling factor and the second scaling factor. In some instances, video encoding unit 21 may signal, in the bitstream, all four of $s_1$, $s_2$, $s_3$, and $s_4$.

Similarly, video decoding unit 29 may determine, based on data in a bitstream comprising an encoded representation of the video data, a luma sample (Y') of a pixel, a Cb sample of the pixel, and the Cr sample of the pixel. For instance, video decoder 30 of video decoding unit 29 may decode a block of video data that contains the pixel. In some examples, video decoder 30 may use HEVC or another video compression technique to decode the block of video data. In examples where HEVC is used, the block may be a CU. Additionally, video decoding unit 29 may obtain, from the bitstream, a first scaling factor and a second scaling factor. In some examples, video decoding unit 29 may obtain syntax elements specifying the first and second scaling factors. Furthermore, in some examples, video decoding unit 29 may obtain syntax elements indicating all four scaling factors $s_1$, $s_2$, $s_3$, and $s_4$. Video postprocessor unit 31 of video decoding unit 29 may determine, based on the first scaling factor, the Cb sample for the pixel, and Y', a converted B sample for the pixel. Furthermore, video postprocessor unit 31 may determine, based on the second scaling factor, the Cr sample for the pixel, and Y', a converted R sample for the pixel. For instance, video postprocessor unit 31 may use the relationships indicated in equation (7) to determine B' and R'. Video postprocessor unit 31 may apply an EOTF to convert Y', R', and B' to a luminance sample (Y) for the pixel, a R sample for the pixel, and a B sample for the pixel, respectively. For instance, video postprocessor unit 31 may apply any of the EOTFs described in this disclosure.

In some examples, the ACL parameters are set as (s1, s2, s3, s4)=(1.0313, 0.8406, 1.1653, 0.6738) for BT. 2020 color primaries and OETF specified in Recommendation ITU-R BT. 2020, "Parameter values for ultra-high definition television systems for production and international programme exchange" (2012) (hereinafter, "BT. 2020"). These ACL parameters lead to the identical formula for NCL and OETF specified in BT. 2020:

$$a.\ Y' = 0.2627*R' + 0.6780*G' + 0.0593*B'$$
$$b.\ Cb = \frac{B'-Y'}{1.8814}$$
$$c.\ Cr = \frac{R'-Y'}{1.4746}$$

In some examples, the ACL parameters are set as (s1, s2, s3, s4)=(1.0457, 0.8523, 1.0912, 0.6309) for BT. 2020 color primaries and the OETF specified in Recommendation ITU-R BT. 2020, "Parameter values for ultra-high definition television systems for production and international programme exchange" (2012) (hereinafter, "BT. 2020"). These ACL parameters lead to the identical formula for NCL and OETF specified in BT. 709:

$$a.\ Y' = 0.2627*R' + 0.6780*G' + 0.0593*B'$$
$$b.\ Cb = \frac{B'-Y'}{1.8556}$$
$$c.\ Cr = \frac{R'-Y'}{1.5748}$$

In some examples, the ACL parameters are set as (s1, s2, s3, s4)=(1.0562, 0.3242, 1.3128, 0.1938) for BT. 2020 color primaries and PQ OETF (the inverse of PQ TF specified in SMPTE ST 2084 [SMPTE ST 2084:2014, "High Dynamic Range Electro-Optical Transfer Function of Mastering Reference Displays", 2014], hereinafter, "SMPTE ST 2084"). These ACL parameters lead to the identical formula for NCL with BT. 2020 and OETF specified in BT. 2020:

$$a.\ Y' = 0.2627*R' + 0.6780*G' + 0.0593*B'$$
$$b.\ Cb = \frac{B'-Y'}{1.8814}$$
$$c.\ Cr = \frac{R'-Y'}{1.4746}$$

In some examples, the ACL parameters set can be reduced to one parameter per color component, $s_1$ for Cb and $s_2$ for Cr, under assumption that color components Cb and Cr are a uni-polar signal and its polarity is known in advance:

$$a.\ Y' = 0.2627*R' + 0.6780*G' + 0.0593*B'$$
$$b.\ Cb = \frac{B'-Y'}{1.8814}$$
$$c.\ Cr = \frac{R'-Y'}{1.4746}$$

Various examples have been described. Particular examples of this disclosure may be used separately or in combination with one another.

Figure 9:
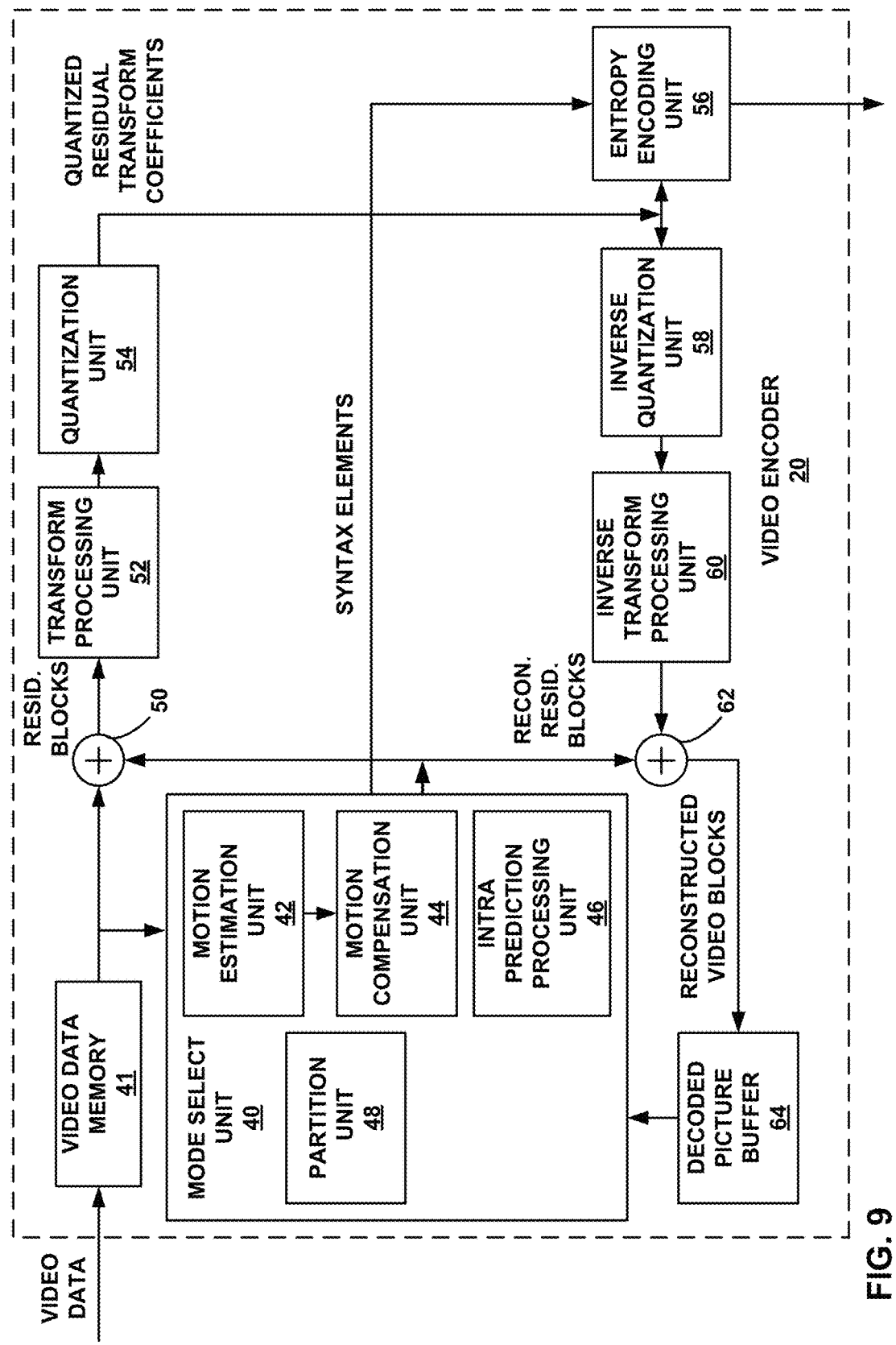
FIG. 9 is a block diagram illustrating an example of a video encoder.

FIG. 9 is a block diagram illustrating an example of video encoder 20 that may implement the techniques of this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 9, video encoder 20 receives a current video block within a video frame to be encoded. In the example of FIG. 9, video encoder 20 includes mode select unit 40, a video data memory 41, a decoded picture buffer 64, a summer 50, a transform processing unit 52, a quantization unit 54, and an entropy encoding unit 56. Mode select unit 40, in turn, includes a motion compensation unit 44, a motion estimation unit 42, an intra prediction processing unit 46, and a partition unit 48. For video block reconstruction, video encoder 20 also includes an inverse quantization unit 58, an inverse transform processing unit 60, and a summer 62. A deblocking filter (not shown in FIG. 9) may also be included to filter block boundaries to remove blockiness artifacts from reconstructed video. If desired, the deblocking filter would typically filter the output of summer 62. Additional filters (e.g., in loop or post loop) may also be used in addition to the deblocking filter. Such filters are not shown for brevity, but if desired, may filter the output of summer 50 (as an in-loop filter).

Video data memory 41 may store video data to be encoded by the components of video encoder 20. The video data stored in video data memory 41 may be obtained, for example, from video source 18. Decoded picture buffer 64 may be a reference picture memory that stores reference video data for use in encoding video data by video encoder 20, e.g., in intra- or inter-coding modes. Video data memory 41 and decoded picture buffer 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 41 and decoded picture buffer 64 may be provided by the same memory device or separate memory devices. In various examples, video data memory 41 may be on-chip with other components of video encoder 20, or off-chip relative to those components.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra prediction processing unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provide the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture (or other coded unit) relative to the current block being coded within the current picture (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra prediction processing unit 46 may intra-predict a current block, as an alternative to the inter-prediction performed by motion estimation unit 42 and motion compensation unit 44, as described above. In particular, intra prediction processing unit 46 may determine an intra-prediction mode to use to encode a current block. In some examples, intra prediction processing unit 46 may encode a current block using various intra-prediction modes, e.g., during separate encoding passes, and intra prediction processing unit 46 (or mode select unit 40, in some examples) may select an appropriate intra-prediction mode to use from the tested modes.

For example, intra prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra-prediction mode exhibits the best rate-distortion value for the block.

After selecting an intra-prediction mode for a block, intra prediction processing unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54.

Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of decoded picture buffer 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in decoded picture buffer 64. The reconstructed video block may be used by motion estimation unit 42 and motion compensation unit 44 as a reference block to inter-code a block in a subsequent video frame.

Figure 10:
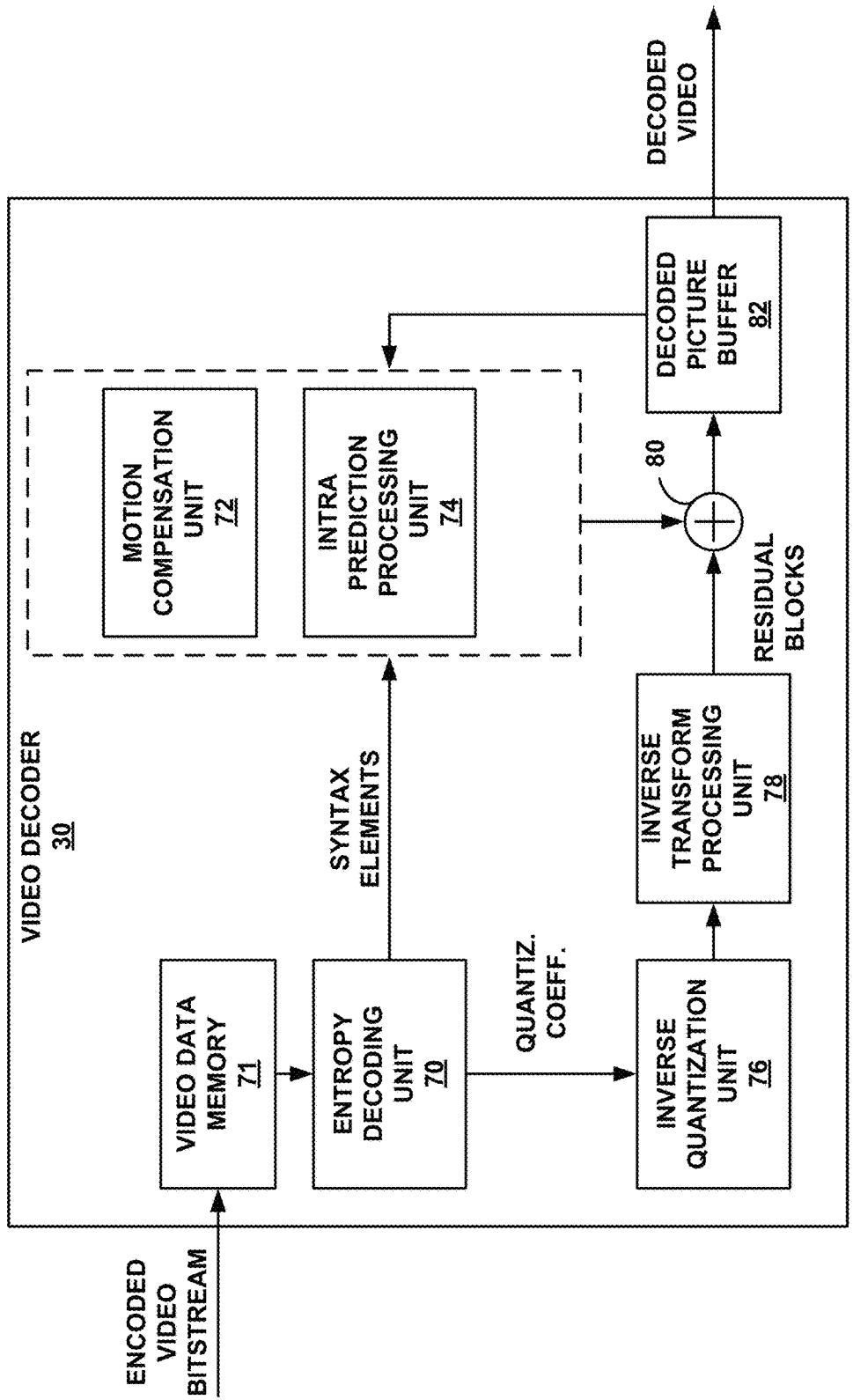
FIG. 10 is a block diagram illustrating an example of a video decoder.

FIG. 10 is a block diagram illustrating an example of video decoder 30 that may implement the techniques of this disclosure. In the example of FIG. 10, video decoder 30 includes an entropy decoding unit 70, a video data memory 71, motion compensation unit 72, intra prediction processing unit 74, inverse quantization unit 76, inverse transform processing unit 78, decoded picture buffer 82 and summer 80. Video decoder 30 may, in some examples, perform a decoding pass generally reciprocal to the encoding pass described with respect to video encoder 20 (FIG. 9). Motion compensation unit 72 may generate prediction data based on motion vectors received from entropy decoding unit 70, while intra prediction processing unit 74 may generate prediction data based on intra-prediction mode indicators received from entropy decoding unit 70.

Video data memory 71 may store video data, such as an encoded video bitstream, to be decoded by the components of video decoder 30. The video data stored in video data memory 71 may be obtained, for example, from computer-readable medium 16, e.g., from a local video source, such as a camera, via wired or wireless network communication of video data, or by accessing physical data storage media. Video data memory 71 may form a coded picture buffer (CPB) that stores encoded video data from an encoded video bitstream. Decoded picture buffer 82 may be a reference picture memory that stores reference video data for use in decoding video data by video decoder 30, e.g., in intra- or inter-coding modes. Video data memory 71 and decoded picture buffer 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 71 and decoded picture buffer 82 may be provided by the same memory device or separate memory devices. In various examples, video data memory 71 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction processing unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in decoded picture buffer 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_y$ calculated by video decoder 30 for each video block in the video slice to determine a degree of quantization and, likewise, a degree of inverse quantization that should be applied. Inverse transform processing unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in decoded picture buffer 82, which stores reference pictures used for subsequent motion compensation. Decoded picture buffer 82 also stores decoded video for later presentation on a display device, such as display device 32 of FIG. 1.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

Figure 11:
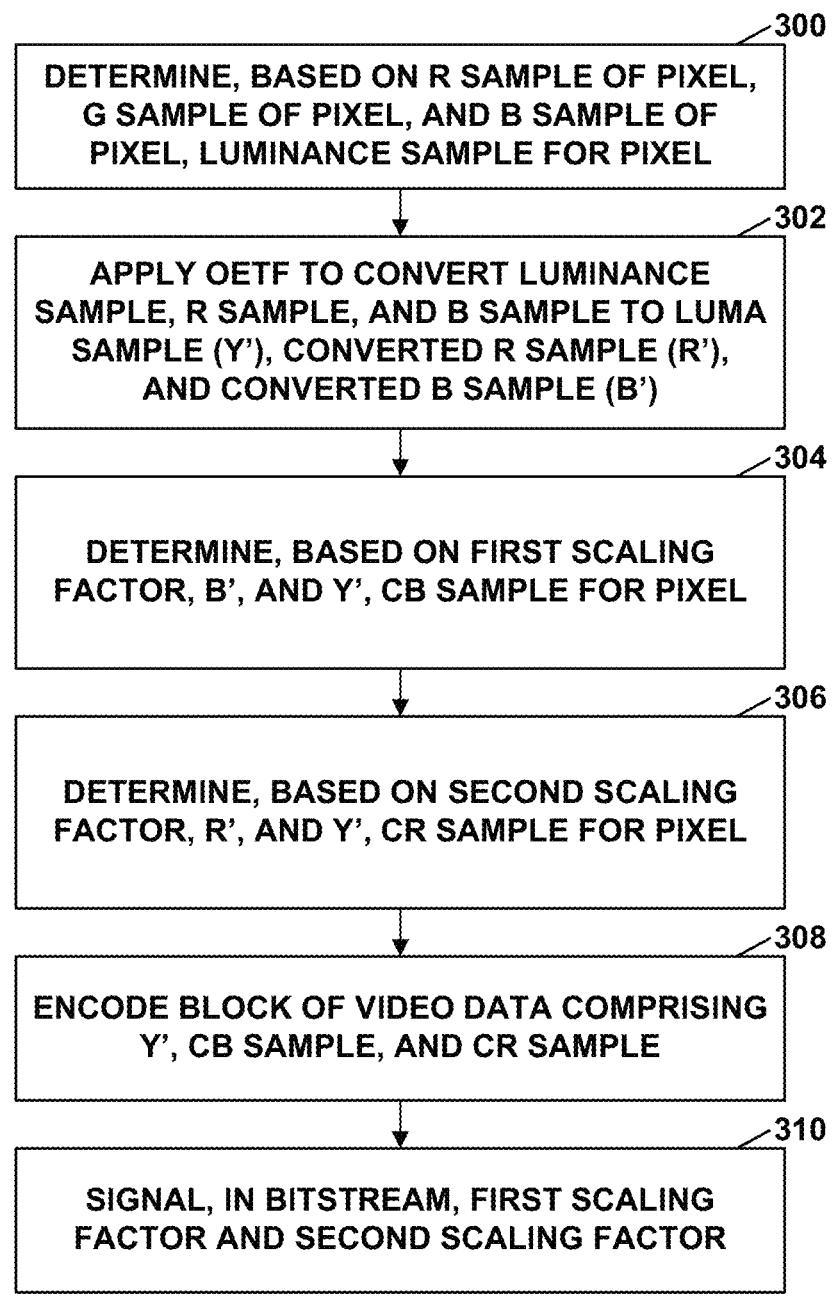
FIG. 11 is a flowchart illustrating an example operation of the video encoder, in accordance with a technique of this disclosure.

FIG. 11 is a flowchart illustrating an example operation of video encoding unit 21, in accordance with a technique of this disclosure. The flowcharts of this disclosure are provided as examples. Other examples of this disclosure may include more, fewer, or different actions. Moreover, in other examples, the actions may be performed in different orders.

In the example of FIG. 11, video encoding unit 21 determines, based on an R sample of a pixel of the video data, a G sample of the pixel, and a B sample of the pixel, a luminance sample (Y) for the pixel (300). The R sample, the G sample, the B sample, and the luminance sample may be in linear light. In other words, the level of luminance is linearly proportional to RGB value. For example, in BT. 2020, luminance Y=0.2627*R+0.6780*G+0.0593*B. Furthermore, video encoding unit 21 may apply an OETF to convert Y, the R sample, and the B sample to a converted luma sample (Y'), a converted R sample (R'), and a converted B sample (B') (302). Thus, in this disclosure, the converted luma sample may be denoted Y', the converted R sample may be denoted R', and the converted B sample may be denoted W.

In the example of FIG. 11, video encoding unit 21 may determine, based on a first scaling factor, B', and Y', a Cb sample for the pixel (304). In this disclosure, the Cb sample may be denoted Cb'. Additionally, video encoding unit 21 may determine, based on a second scaling factor, R', and Y', a Cr sample for the pixel (306). In this disclosure, the Cr sample may be denoted Cr'.

Video encoding unit 21 may encode a block of video data comprising Y', the Cb sample, and the Cr sample (308). For example, video encoding unit 21 may use HEVC or another video compression system for encoding the block. An example of how video encoding unit 21 may encode the block in HEVC is described elsewhere in this disclosure. In some examples, the block of video data is a CU.

Additionally, in the example of FIG. 11, video encoding unit 21 may signal, in a bitstream comprising a coded representation of the video data, the first scaling factor and the second scaling factor (310). The first scaling factor may be the one of $s_1$ or $s_2$ used for determining the Cb sample. For example, if $$-\frac{Nb}{2} \le B' - Y' < 0,$$

the first scaling factor is $s_1$ and if $$0 < B' - Y' \le \frac{Pb}{2},$$

the first scaling factor is $s_2$. The second scaling factor may be the one of $s_3$ or $s_4$ used for determining the Cr sample. For example, $$\text{if } -\frac{Nr}{2} \le R' - Y' < 0,$$

the second scaling factor is $s_3$ and if $$0 < R' - Y' \le \frac{Pr}{2},$$

the second scaling factor is $s_4$. For instance, video encoding unit 21 may signal the first scaling factor and the second scaling factor in at least one of: metadata of the bitstream, an SEI message in the bitstream, or video usability information in the bitstream.

Figure 12:
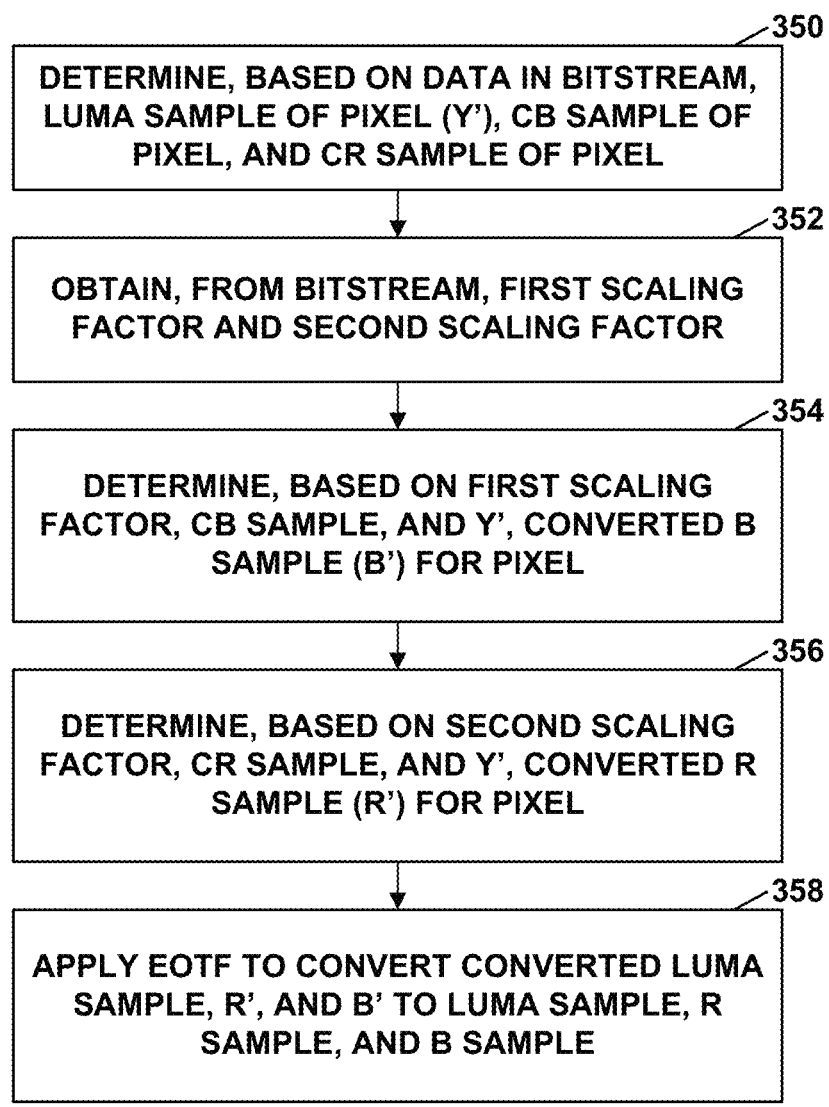
FIG. 12 is a flowchart illustrating an example operation of the video decoder, in accordance with a technique of this disclosure.

FIG. 12 is a flowchart illustrating an example operation of video decoding unit 29, in accordance with a technique of this disclosure. In the example of FIG. 12, video decoding unit 29 may determine, based on data in a bitstream comprising an encoded representation of the video data, a luma sample (Y') of a pixel, a Cb sample of the pixel, and the Cr sample of the pixel (350). For instance, video decoding unit 29 may use HEVC or another video compression technique to decode a block of the video data that includes Y', the Cb sample, and the Cr sample. Examples of how video decoder 30 may decode a block of video data, such as a CU, using HEVC are provided elsewhere in this disclosure.

Furthermore, video decoding unit 29 may obtain, from the bitstream, a first scaling factor and a second scaling factor (352). The first scaling factor may be the one of $s_1$ or $s_2$ used for determining the Cb sample. For example, if $$-\frac{Nb}{2} \le B' - Y' < 0,$$

the first scaling factor is $s_1$ and if $$0 < B' - Y' \le \frac{Pb}{2},$$

the first scaling factor is $s_2$. The second scaling factor may be the one of $s_3$ or $s_4$ used for determining the Cr sample. For example, if $$-\frac{Nr}{2} \le R' - Y' < 0,$$

the second scaling factor is $s_3$ and if $$0 < R' - Y' \le \frac{Pr}{2},$$

the second scaling factor is $s_4$.

Furthermore, video decoding unit 29 may determine, based on a first scaling factor, the Cb sample for the pixel, and Y', a converted B sample (B') for the pixel (354). Additionally, video decoding unit 29 may determine, based on a second scaling factor, the Cr sample for the pixel, and Y', a converted R sample (R') for the pixel (356). Video decoding unit 29 may determine B' and R' in accordance with any of the examples provided elsewhere in this disclosure.

Video decoding unit 29 may apply an EOTF to convert Y', R', and B' to a luminance sample (Y) for the pixel, a R sample for the pixel, and a B sample for the pixel, respectively (358). The R sample, the G sample, and the luminance sample are in linear light. Video decoding unit 29 may apply the EOTF to convert Y', R', and B' in accordance with any of the examples provided elsewhere in this disclosure. Furthermore, in some examples, video decoding unit 29 applies an inverse transfer function, such as the inverses of transfer functions described elsewhere in this disclosure, to determine, based on the luminance sample for the pixel, the R sample for the pixel, and the B sample for the pixel, a G sample for the pixel, the G sample being in linear light. Thus, video decoding unit 29 may derive R, G, and B samples for the pixel.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
    determining, based on a R sample of a pixel of the video data, a G sample of the pixel, and a B sample of the pixel, a luminance sample (Y) for the pixel, wherein the R sample, the G sample, the B sample, and the luminance sample are in linear light;
    applying an optical-electro transfer function (OETF) to convert Y, the R sample, and the B sample to a luma sample (Y'), a converted R sample (R'), and a converted B sample (B'), respectively;
    determining a first scaling factor of a set of Adaptive Constant-Luminance (ACL) parameters based on one or more of a characteristic of the video data, color primaries utilized in the video data, or the OETF;
    determining, based on the first scaling factor of the set of ACL parameters, B', and Y', a Cb sample for the pixel;

determining a second scaling factor of the set of ACL parameters based on one or more of the characteristic of the video data, the color primaries utilized in the video data, or the OETF;

determining, based on the second scaling factor of the set of ACL parameters, R', and Y', a Cr sample for the pixel;

encoding a block of video data comprising Y', the Cb sample, and the Cr sample; and signaling, in a bitstream comprising a coded representation of the video data, the first scaling factor and the second scaling factor.

2. The method of claim 1, wherein signaling the first scaling factor and the second scaling factor comprises signaling the first scaling factor and the second scaling factor in one of: metadata of the bitstream, an SEI message in the bitstream, or video usability information in the bitstream.

3. The method of claim 1, wherein:

the value of the first scaling factor is dependent on whether the difference between B' and Y' is in a first range or a second range not overlapping the first range, and the value of the second scaling factor is dependent on whether the difference between R' and Y' is in a third range or a fourth range not overlapping the third range.

4. The method of claim 3, wherein:

$$Cb' = \begin{cases} s_1 \dfrac{B' - Y'}{Nb}, & -\dfrac{Nb}{2} \le B' - Y' < 0 \\ s_2 \dfrac{B' - Y'}{Pb}, & 0 < B' - Y' \le \dfrac{Pb}{2} \end{cases}$$

$$Cr' = \begin{cases} s_3 \dfrac{R' - Y'}{Nr}, & -\dfrac{Nr}{2} \le R' - Y' < 0 \\ s_4 \dfrac{R' - Y'}{Pr}, & 0 < R' - Y' \le \dfrac{Pr}{2} \end{cases}$$

where Cb' is the Cb sample for the pixel, Cr' is the Cr sample for the pixel, $s_1$ and $s_2$ are values of the first scaling factor, Nb and Pb are values of a first denominator value, $s_3$ and $s_4$ are values of the second scaling factor, and Nr and Pr are values of a second denominator value.

5. The method of claim 4, wherein $s_1$, $s_2$, $s_3$, and $s_4$ are constant for all pictures of the video data.

6. The method of claim 4, wherein:

$Nb = 2*TF(1-C_B)$ $Pb = 2*(TF(C_B))$ $Nr = 2*TF(1-C_R)$ $Pr = 2*(1-TF(C_R))$ where TF is the OETF and $C_B$ and $C_R$ are parameters of a color transform.

7. The method of claim 1, further comprising adaptively determining the first scaling factor and the second scaling factor.

8. A method of decoding video data, the method comprising:

determining, based on data in a bitstream comprising an encoded representation of the video data, a luma sample (Y') of a pixel, a Cb sample of the pixel, and a Cr sample of the pixel;

obtaining, from the bitstream, a first scaling factor of a set of Adaptive Constant-Luminance (ACL) parameters and a second scaling factor of the set of ACL parameters;

determining, based on the first scaling factor, the Cb sample for the pixel, and Y', a converted B sample (B') for the pixel, wherein the first scaling factor is based on one or more of a characteristic of the video data, color primaries utilized in the video data, or an optical-electro transfer function (OETF);

determining, based on the second scaling factor, the Cr sample for the pixel, and Y', a converted R sample (R') for the pixel, wherein the second scaling factor is based on one or more of the characteristic of the video data, the color primaries utilized in the video data, or the OETF; and applying an electro-optical transfer function (EOTF) to convert Y', R' and B' to a luminance sample (Y) for the pixel, a R sample for the pixel, and a B sample for the pixel, respectively, wherein the R sample, the G sample, and the luminance sample are in linear light.

9. The method of claim 8, further comprising applying an inverse transfer function to determine, based on the luminance sample Y for the pixel, the R sample for the pixel, and the B sample for the pixel, a G sample for the pixel, the G sample being in linear light.

10. The method of claim 8, wherein obtaining the first scaling factor and the second scaling factor comprises: obtaining the first scaling factor and the second scaling factor from at least one of: metadata of the bitstream, an SEI message in the bitstream, or video usability information in the bitstream.

11. The method of claim 8, wherein:

the value of the first scaling factor is dependent on whether the difference between B' and Y' is in a first range or a second range not overlapping the first range, and the value of the second scaling factor is dependent on whether the difference between R' and Y' is in a third range or a fourth range not overlapping the third range.

12. The method of claim 11, wherein:

$$Cb' = \begin{cases} s_1 \dfrac{B' - Y'}{Nb}, & -\dfrac{Nb}{2} \le B' - Y' < 0 \\ s_2 \dfrac{B' - Y'}{Pb}, & 0 < B' - Y' \le \dfrac{Pb}{2} \end{cases}$$

$$Cr' = \begin{cases} s_3 \dfrac{R' - Y'}{Nr}, & -\dfrac{Nr}{2} \le R' - Y' < 0 \\ s_4 \dfrac{R' - Y'}{Pr}, & 0 < R' - Y' \le \dfrac{Pr}{2} \end{cases}$$

where Cb' is the Cb sample for the pixel, Cr' is the Cr sample for the pixel, $S_1$ and $s_2$ are values of the first scaling factor, Nb and Pb are values of a first denominator value, $s_3$ and $s_4$ are values of the second scaling factor, and Nr and Pr are values of a second denominator value.

13. The method of claim 12, wherein $S_1$, $s_2$, $s_3$, and $s_4$ are constant for all pictures of the video data.

14. The method of claim 12, wherein:

$Nb = 2*TF(1-C_B)$ $Pb = 2*(TF(C_B))$ $Nr = 2*TF(1-C_R)$ $Pr = 2*(1-TF(C_R))$ where TF is an optical-electro transfer function and $C_B$ and $C_R$ are parameters of a color transform.

15. An apparatus for encoding video data, the apparatus comprising:
a storage medium configured to store the video data; and
one or more processors configured to:
  determine, based on a R sample of a pixel of the video data, a G sample of the pixel, and a B sample of the pixel, a luminance sample (Y) for the pixel, wherein the R sample, the G sample and the luminance sample are in linear light;
  apply an optical-electro transfer function (OETF) to convert the luminance sample, the R sample, and the B sample to a luma sample (Y'), a converted R sample (R'), and a converted B sample (B');
  determine a first scaling factor of a set of Adaptive Constant-Luminance (ACL) parameters based on one or more of a characteristic of the video data, color primaries utilized in the video data, or the OETF;
  determine, based on the first scaling factor of the set of ACL parameters, B', and Y', a Cb sample for the pixel;
  determine a second scaling factor of the set of ACL parameters based on one or more of the characteristic of the video data, the color primaries utilized in the video data, or the OETF;
  determine, based on the second scaling factor of the set of ACL parameters, R', and Y', a Cr sample for the pixel;
  encode a block of video data comprising Y', the Cb sample, and the Cr sample; and
  signal, in a bitstream comprising a coded representation of the video data, the first scaling factor and the second scaling factor.

16. The apparatus of claim 15, wherein the one or more processors are configured to signal the first scaling factor and the second scaling factor in one of: metadata of the bitstream, an SEI message in the bitstream, or video usability information in the bitstream.

17. The apparatus of claim 15, wherein:
the value of the first scaling factor is dependent on whether the difference between B' and Y' is in a first range or a second range not overlapping the first range, and
the value of the second scaling factor is dependent on whether the difference between the R' and Y' is in a third range or a fourth range not overlapping the third range.

18. The apparatus of claim 17, wherein:

$$Cb' = \begin{cases} s_1 \dfrac{B' - Y'}{Nb}, & -\dfrac{Nb}{2} \le B' - Y' < 0 \\ s_2 \dfrac{B' - Y'}{Pb}, & 0 < B' - Y' \le \dfrac{Pb}{2} \end{cases}$$

$$Cr' = \begin{cases} s_3 \dfrac{R' - Y'}{Nr}, & -\dfrac{Nr}{2} \le R' - Y' < 0 \\ s_4 \dfrac{R' - Y'}{Pr}, & 0 < R' - Y' \le \dfrac{Pr}{2} \end{cases}$$

where Cb' is the Cb sample for the pixel, Cr' is the Cr sample for the pixel, $s_1$ and $s_2$ are values of the first scaling factor, Nb and Pb are values of a first denominator value, $s_3$ and $s_4$ are values of the second scaling factor, and Nr and Pr are values of a second denominator value.

19. The apparatus of claim 18, wherein $s_1$, $s_2$, $s_3$, and $s_4$ are constant for all pictures of the video data.

20. The apparatus of claim 18, wherein:

$Nb=2*TF(1-C_B)$ $Pb=2*(TF(C_B))$ $Nr=2*TF(1-C_R)$ $Pr=2*(1-TF(C_R))$ where TF is the OETF and $C_B$ and $C_R$ are parameters of a color transform.

21. The apparatus of claim 15, wherein the one or more processors are configured to adaptively determine the first scaling factor and the second scaling factor.

22. An apparatus for decoding video data, the apparatus comprising:
a storage medium configured to store the video data; and
one or more processors configured to:
  determine, based on data in a bitstream comprising an encoded representation of the video data, a luma sample (Y') of a pixel, a Cb sample of the pixel, and a Cr sample of the pixel;
  obtain, from the bitstream, a first scaling factor of a set of Adaptive Constant-Luminance (ACL) parameters and a second scaling factor of the set of ACL parameters;
  determine, based on the first scaling factor, the Cb sample for the pixel, and Y', a converted B sample (B') for the pixel, wherein the first scaling factor is based on one or more of a characteristic of the video data, color primaries utilized in the video data, or an optical-electro transfer function (OETF);
  determine, based on the second scaling factor, the Cr sample for the pixel, and Y', a converted R sample (R') for the pixel, wherein the second scaling factor is based on one or more of the characteristic of the video data, the color primaries utilized in the video data, or the OETF; and
  apply an electro-optical transfer function (EOTF) to convert Y', R', and B' to a luminance sample (Y) for the pixel, a R sample for the pixel, and a B sample for the pixel, respectively, wherein the R sample, the G sample, and the luminance sample are in linear light.

23. The apparatus of claim 22, wherein the one or more processors are further configured to apply an inverse transfer function to determine, based on the luminance sample for the pixel, the R sample for the pixel, and the B sample for the pixel, a G sample for the pixel, the G sample being in linear light.

24. The apparatus of claim 22, wherein the one or more processors are configured to obtain the first scaling factor and the second scaling factor from one of: metadata of the bitstream, an SEI message in the bitstream, or video usability information in the bitstream.

25. The apparatus of claim 22, wherein:
the value of the first scaling factor is dependent on whether the difference between B' and Y' is in a first range or a second range not overlapping the first range, and
the value of the second scaling factor is dependent on whether the difference between R' and Y' is in a third range or a fourth range not overlapping the third range.

26. The apparatus of claim 25, wherein:

$$Cb' = \begin{cases} s_1 \dfrac{B'-Y'}{Nb}, & -\dfrac{Nb}{2} \leq B'-Y' < 0 \\ s_2 \dfrac{B'-Y'}{Pb}, & 0 < B'-Y' \leq \dfrac{Pb}{2} \end{cases}$$

$$Cr' = \begin{cases} s_3 \dfrac{R'-Y'}{Nr}, & -\dfrac{Nr}{2} \leq R'-Y' < 0 \\ s_4 \dfrac{R'-Y'}{Pr}, & 0 < R'-Y' \leq \dfrac{Pr}{2} \end{cases}$$

where Cb' is the Cb sample for the pixel, Cr' is the Cr sample for the pixel, $S_1$ and $s_2$ are values of the first scaling factor, Nb and Pb are values of a first denominator value, $s_3$ and $s_4$ are values of the second scaling factor, and Nr and Pr are values of a second denominator value.

27. The apparatus of claim 26, wherein $S_1$, $s_2$, $s_3$, and $s_4$ are constant for all pictures of the video data.

28. The apparatus of claim 27, wherein:

$Nb = 2*TF(1-C_B)$ $Pb = 2*(TF(C_B))$ $Nr = 2*TF(1-C_R)$ $Pr = 2*(1-TF(C_R))$ where TF is an optical-electro transfer function and $C_B$ and $C_R$ are parameters of a color transform.

* * * * *